(12) United States Patent
Honda

(10) Patent No.: US 12,233,877 B2
(45) Date of Patent: Feb. 25, 2025

(54) VEHICLE TRAVEL ASSISTANCE APPARATUS

(71) Applicant: SUBARU CORPORATION, Tokyo (JP)

(72) Inventor: Shigeru Honda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 478 days.

(21) Appl. No.: 17/221,897

(22) Filed: Apr. 5, 2021

(65) Prior Publication Data

US 2021/0316734 A1 Oct. 14, 2021

(30) Foreign Application Priority Data

Apr. 14, 2020 (JP) .................................. 2020-072240

(51) Int. Cl.
*B60W 40/04* (2006.01)
*B60W 30/16* (2020.01)
(Continued)

(52) U.S. Cl.
CPC ............ *B60W 40/04* (2013.01); *B60W 30/16* (2013.01); *B60W 40/10* (2013.01); *G06V 20/584* (2022.01);
(Continued)

(58) Field of Classification Search
CPC ...... B60W 40/04; B60W 30/16; B60W 40/10; B60W 2554/4041; B60W 2554/80;
(Continued)

(56) References Cited

U.S. PATENT DOCUMENTS 8,019,122 B2 * 9/2011 Zou .................... G06V 20/58
348/148
9,460,354 B2 * 10/2016 Fernandez ............ G06V 20/58
(Continued)

FOREIGN PATENT DOCUMENTS

JP 2002327635 A * 11/2002
JP 2011-65442 A 3/2011
(Continued)

OTHER PUBLICATIONS

Notice of Reasons for Refusal issued in Japanese Patent Application No. 2020-072240 dated Dec. 26, 2023, with machine translation.

*Primary Examiner* — Mohamed Abdo Algehaim
(74) *Attorney, Agent, or Firm* — TROUTMAN PEPPER LOCKE LLP

(57) ABSTRACT

A vehicle travel assistance apparatus includes a traveling environment information acquiring unit, a preceding vehicle recognizing unit, a vehicle shadow detector, a front vehicle shadow determining unit, and a second preceding vehicle estimating unit. The vehicle shadow detector detects a vehicle shadow of a train of vehicles including a first vehicle shadow of a first preceding vehicle recognized by the preceding vehicle recognizing unit and a front vehicle shadow of a front vehicle traveling in front of the first preceding vehicle based on a brightness difference from a road surface. When the front vehicle shadow determining unit determines that the front vehicle shadow separating from the first vehicle shadow is identified from the vehicle shadow, the second preceding vehicle estimating unit estimates a position of a second preceding vehicle belonging to the train of the vehicles including the first preceding vehicle based on the front vehicle shadow.

6 Claims, 11 Drawing Sheets

(51) Int. Cl.
B60W 40/10 (2012.01)
G06V 20/58 (2022.01)

(52) U.S. Cl.
CPC . *B60W 2554/4041* (2020.02); *B60W 2554/80* (2020.02); *B60W 2555/20* (2020.02)

(58) Field of Classification Search
CPC ............ B60W 2555/20; B60W 50/14; B60W 2554/00; B60W 2554/404; B60W 40/00–40/13; G06V 20/584; G06V 20/58; G06V 20/588; G06V 20/00–20/95; G06T 11/2433; G06T 15/60; G06T 2215/12
USPC .......................................................... 701/1
See application file for complete search history.

(56) References Cited

U.S. PATENT DOCUMENTS

| | | | |
|---|---|---|---|
| 9,672,431 B2* | 6/2017 | Fernandez | G06T 7/13 |
| 9,702,183 B1* | 7/2017 | Ochiai | B60J 3/007 |
| 2006/0155469 A1* | 7/2006 | Kawasaki | G01S 13/931 |
| | | | 340/436 |
| 2009/0237269 A1* | 9/2009 | Okugi | G08G 1/163 |
| | | | 340/901 |
| 2012/0136510 A1* | 5/2012 | Min | G01S 17/88 |
| | | | 701/2 |
| 2012/0140988 A1* | 6/2012 | Takahashi | G06V 20/58 |
| | | | 382/103 |
| 2013/0147957 A1* | 6/2013 | Stein | G06V 20/58 |
| | | | 348/148 |
| 2014/0037142 A1* | 2/2014 | Bhanu | G06V 10/98 |
| | | | 382/103 |
| 2015/0066310 A1* | 3/2015 | Kim | G05D 3/10 |
| | | | 701/49 |
| 2016/0075335 A1* | 3/2016 | Arndt | B60W 30/16 |
| | | | 701/96 |
| 2016/0224847 A1* | 8/2016 | Fernandez | G06V 20/58 |
| 2016/0253566 A1* | 9/2016 | Stein | G06T 7/20 |
| | | | 348/148 |
| 2016/0355181 A1* | 12/2016 | Morales Teraoka | G08G 1/166 |
| 2017/0158175 A1* | 6/2017 | Fairfield | B60W 60/00276 |
| 2017/0197620 A1* | 7/2017 | Igarashi | B60W 30/165 |
| 2017/0269364 A1* | 9/2017 | Fujita | H04N 23/00 |
| 2017/0297576 A1* | 10/2017 | Halder | G08G 1/096844 |
| 2017/0356993 A1* | 12/2017 | Lee | G01S 13/93 |
| 2018/0101736 A1* | 4/2018 | Han | G06T 11/60 |
| 2018/0144199 A1* | 5/2018 | Perez Barrera | G06V 20/58 |
| 2019/0118806 A1* | 4/2019 | Augst | G08G 1/166 |
| 2019/0213888 A1* | 7/2019 | Koishi | B60R 16/03 |
| 2019/0339706 A1* | 11/2019 | Batur | G05D 1/0088 |
| 2020/0031339 A1* | 1/2020 | Tanaka | B60W 30/16 |
| 2020/0042801 A1* | 2/2020 | Auner | G06T 7/73 |
| 2020/0223433 A1* | 7/2020 | Koshizen | G08G 1/0112 |
| 2020/0278681 A1* | 9/2020 | Gier | G05D 1/0246 |
| 2020/0301429 A1* | 9/2020 | Matsunaga | G05D 1/0212 |
| 2020/0349365 A1* | 11/2020 | Behrendt | G06N 3/08 |
| 2021/0109543 A1* | 4/2021 | Hiromitsu | G06V 20/58 |
| 2021/0201667 A1* | 7/2021 | Grubwinkler | B60W 30/18127 |
| 2022/0024450 A1* | 1/2022 | Roh | B62D 15/0285 |
| 2022/0319192 A1* | 10/2022 | Tani | G16Y 20/10 |
| 2022/0410931 A1* | 12/2022 | Jost | B60W 30/0956 |
| 2023/0159035 A1* | 5/2023 | Tanaka | B60W 30/0956 |
| | | | 701/70 |
| 2023/0339487 A1* | 10/2023 | Okuda | B60W 10/08 |
| 2023/0339515 A1* | 10/2023 | Hayakawa | B60W 60/0027 |

FOREIGN PATENT DOCUMENTS

| | | | |
|---|---|---|---|
| JP | 2011065442 A | * | 3/2011 |
| JP | 2011215906 A | * | 10/2011 |
| JP | 2013-61274 A | | 4/2013 |

* cited by examiner

VEHICLE TRAVEL ASSISTANCE APPARATUS

CROSS-REFERENCE TO RELATED APPLICATIONS

The present application claims priority from Japanese Patent Application No. 2020-072240 filed on Apr. 14, 2020, the entire contents of which are hereby incorporated by reference.

BACKGROUND

The technology relates to a vehicle travel assistance apparatus.

Known adaptive cruise control (ACC) causes an own vehicle to travel at a predetermined vehicle speed when a preceding vehicle traveling immediately in front of the own vehicle (hereinafter referred to as a "first preceding vehicle") is away from the own vehicle by a distance greater than a target inter-vehicular distance set by the own vehicle, or when no preceding vehicle is detected in front of the own vehicle.

In contrast, when the first preceding vehicle away from the own vehicle by the target inter-vehicular distance or greater is coming closer to the own vehicle and traveling at a vehicle speed lower than that of the own vehicle, the ACC controls the vehicle speed of the own vehicle so as to cause the own vehicle to travel following the first preceding vehicle while maintaining the target inter-vehicular distance. Even when an actual inter-vehicular distance becomes shorter than the target inter-vehicular distance due to abrupt deceleration of the first preceding vehicle, the ACC prevents the own vehicle from contacting the first preceding vehicle by rapidly decelerating the own vehicle by a braking operation.

In this case, recognizing the behavior of a vehicle traveling in front of the first preceding vehicle (hereinafter referred to as a "second preceding vehicle") helps estimate abrupt deceleration of the first preceding vehicle and enables the own vehicle to decelerate with a margin of time. In a situation where the behavior of the second preceding vehicle is recognizable from the own vehicle through the windshield glass of the preceding vehicle, for example, it is possible to estimate a brake timing of the first preceding vehicle on the basis of the behavior of the second preceding vehicle or to decelerate the own vehicle prior to the brake timing of the preceding vehicle.

However, when the front field of view of the own vehicle is limited by the first preceding vehicle with a closed rear body end, such as a van body truck, a large truck, or a full-size bus, it is difficult to estimate the brake timing of the first preceding vehicle on the basis of the behavior of the second preceding vehicle. To address such an issue, a technique disclosed in Japanese Unexamined Patent Application Publication (JP-A) No. 2013-61274, for example, detects the second preceding vehicle by outputting a radar wave from a radar wave transmitter mounted on the own vehicle. The radar wave is reflected off a road surface below the first preceding vehicle, travels to the second preceding vehicle, is reflected from the second preceding vehicle and then from the road surface, and enters a radar wave receiver mounted on the own vehicle.

SUMMARY

An aspect of the technology provides a vehicle travel assistance apparatus including a traveling environment information acquiring unit, a preceding vehicle recognizing unit, a vehicle shadow detector, a front vehicle shadow determining unit, and a second preceding vehicle estimating unit. The traveling environment information acquiring unit is configured to acquire information on a traveling environment in front of an own vehicle. The preceding vehicle recognizing unit is configured to recognize a first preceding vehicle traveling immediately in front of the own vehicle on the basis of the information on the traveling environment acquired by the traveling environment information acquiring unit. The vehicle shadow detector is configured to detect a vehicle shadow of a train of vehicles including a first vehicle shadow of the first preceding vehicle recognized by the preceding vehicle recognizing unit and a front vehicle shadow of a front vehicle traveling in front of the first preceding vehicle on the basis of a difference in brightness from a road surface. The front vehicle shadow determining unit is configured to determine whether the front vehicle shadow separating from the first vehicle shadow of the first preceding vehicle is identified from the vehicle shadow detected by the vehicle shadow detector. The second preceding vehicle estimating unit is configured to estimate, in a case where the front vehicle shadow determining unit determines that the front vehicle shadow is identified from the vehicle shadow, a position of a second preceding vehicle belonging to the train of the vehicles including the first preceding vehicle on the basis of the front vehicle shadow.

An aspect of the technology provides a vehicle travel assistance apparatus including circuitry configured to acquire information on a traveling environment in front of an own vehicle; recognize a first preceding vehicle traveling immediately in front of the own vehicle on the basis of the information on the traveling environment; detect a vehicle shadow of a train of vehicles including a first vehicle shadow of the first preceding vehicle and a front vehicle shadow of a front vehicle traveling in front of the first preceding vehicle on the basis of a difference in brightness from a road surface; determine whether the front vehicle shadow separating from the first vehicle shadow of the first preceding vehicle is identified from the vehicle shadow; and estimate, in a case where it is determined that the front vehicle shadow is identified from the vehicle shadow, a position of a second preceding vehicle belonging to the train of the vehicles including the first preceding vehicle on the basis of the front vehicle shadow.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

In the technique disclosed in JP-A No. 2013-61274, a radar wave reflected off a road surface below the first preceding vehicle travels to the second preceding vehicle. Unfortunately, in a case where the first preceding vehicle is a large truck, a full-size bus, or another vehicle having a large longitudinal length, the radar wave reflected off the road surface can be incident on the vehicle body floor or the chassis of the first preceding vehicle without traveling toward the second preceding vehicle. This can result in misrecognition of the second preceding vehicle. In another case where the own vehicle and the first preceding vehicle are traveling away from each other by a long inter-vehicular distance, the radar wave reflected off the road surface tends to be incident on the floor surface of the first preceding vehicle. This can result in misrecognition of the second preceding vehicle.

Therefore, the technique disclosed in JP-A No. 2013-61274 finds it difficult to accurately detect the presence of the second preceding vehicle and accurately estimate a brake timing of the first preceding vehicle on the basis of the behavior of the second preceding vehicle.

It is desirable to provide a vehicle travel assistance apparatus that recognizes the presence of the second preceding vehicle with high accuracy.

Figure 1:
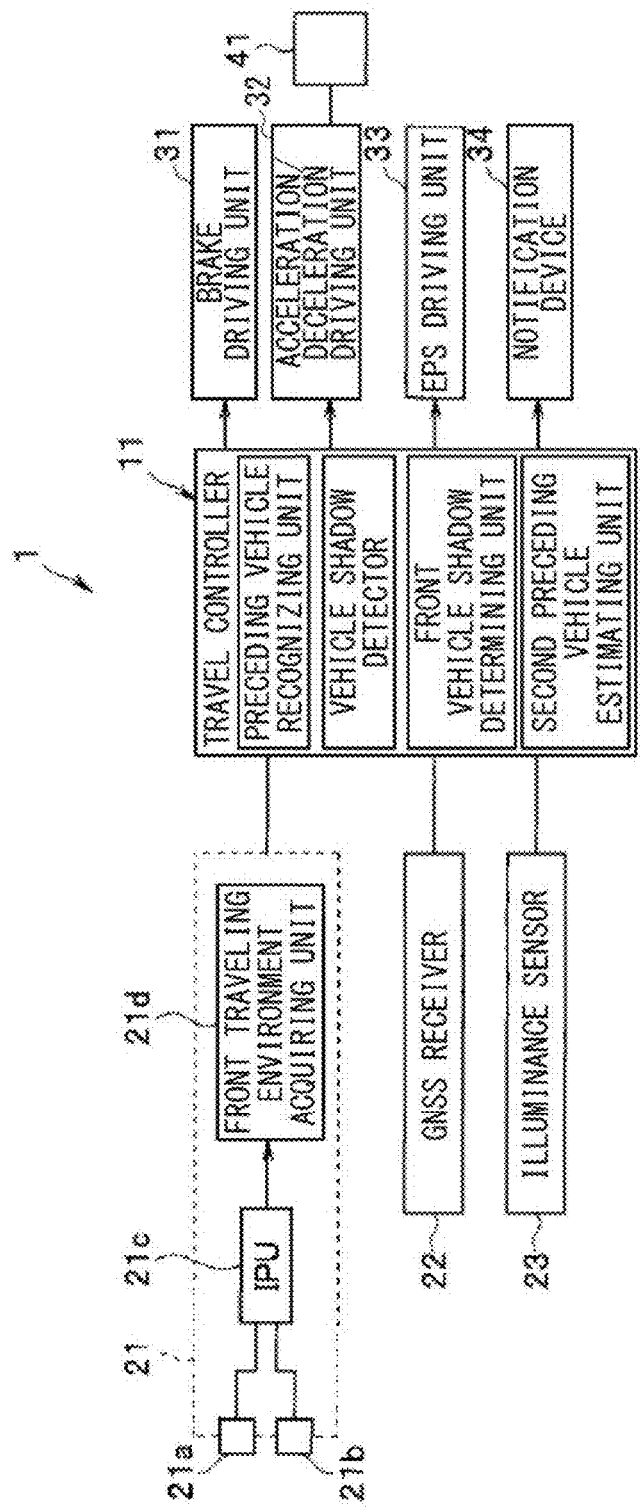
FIG. 1 is a block diagram schematically illustrating an exemplary configuration of a travel assistance apparatus according to one example embodiment of the technology.

Hereinafter, some example embodiments of the technology will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1 illustrates a travel assistance apparatus 1 mounted on an own vehicle M illustrated in FIGS. 7 and 8. The travel assistance apparatus 1 may include a travel controller 11 and a camera unit 21. The travel controller 11 and a front traveling environment acquiring unit 21d (described later) of the camera unit 21 may each include a known microcomputer that includes a CPU, a RAM, a ROM, and a non-volatile memory, and peripheral devices of the microcomputer. The ROM may preliminarily store fixed data such as programs to be executed by the CPU, tables, and maps, for example.

The camera unit 21 may be fixed on an upper central portion of a front interior compartment of the own vehicle M. The camera unit 21 may include an in-vehicle camera (stereo camera), an image processing unit (IPU) 21c, and the front traveling environment acquiring unit 21d. The in-vehicle camera may include a main camera 21a and a sub-camera 21b that are disposed symmetrically to each other about a middle of the vehicle width (center of the vehicle width). The main camera 21a of the camera unit 21 may acquire a reference image data, and the sub-camera 21b of the camera unit 21 may acquire a comparative image data. In one embodiment, the front traveling environment acquiring unit 21d may serve as a "traveling environment information acquiring unit".

The reference image data and the comparative image data may be subjected to predetermined image processing in an imaging processing unit (IPU) 21c. The front traveling environment acquiring unit 21d may read the reference image data and the comparative image data subjected to the image processing in the IPU 21c, and recognize identical objects appearing in the reference image data and the comparative image data on the basis of a parallax between the reference image data and the comparative image data. The front traveling environment acquiring unit 21d may also calculate distance data indicative of a distance from the own vehicle M to the object on the basis of the principle of triangulation to acquire front traveling environment information.

The front traveling environment information may include data on the shape of a road lane on which the own vehicle M is traveling (hereinafter referred to as a traveling lane), data on an obstacle present in front of the own vehicle M, and data on traffic lights and signal indications (signal colors). Examples of the shape of the traveling lane may include mark lines defining the right and left sides of the traveling lane, the road curvature [1/m] at the middle of the traveling lane defined by the mark lines, and the width of the traveling lane defined by the right and left mark lines (i.e., lane width). Examples of the obstacle may include a preceding vehicle, a pedestrian crossing the traveling lane, a bicycle, a telephone pole, a power pole, and a parking vehicle. The front traveling environment information may be obtained through a known pattern matching method. The front traveling environment information may further include data on the shadow of the preceding vehicles (hereinafter referred to as a vehicle shadow) on the road surface. The vehicle shadow may be identified by detecting edges moving on the road and having different brightness from the road surface.

The front traveling environment information may be read by the travel controller 11. The travel controller 11 may have an input coupled to the front traveling environment acquiring unit 21d, a global navigation satellite system (GNSS) receiver 22, and an illuminance sensor 23 that detects the intensity of sunlight. The GNSS receiver 22 may receive positioning signals and time signals outputted from a plurality of positioning satellites. The illuminance sensor 23 may be disposed on an inner side of the front windshield.

The travel controller 11 may have an output coupled to a brake driving unit 31, an acceleration/deceleration driving unit 32, an electric power steering (EPS) driving unit 33, and a notification device 34. The brake driving unit 31 may decelerate the own vehicle M by forcible braking to avoid contact with an object. The acceleration/deceleration driving unit 32 may regulate an output of a power source 41, such as an engine and a motor, in accordance with the amount of accelerator operation by the driver as appropriate. The EPS driving unit 33 may drive a non-illustrated EPS motor. The notification device 34 may be, for example, a monitor or speaker that notifies the driver of the own vehicle M of alerting information.

On the basis of the front traveling environment information acquired by the front traveling environment acquiring unit 21d, the travel controller 11 may perform known adaptive cruise control (ACC) and known active lane keep (ALK) control. Through the ACC, the travel controller 11 may recognize a first preceding vehicle P1 (see FIGS. 7 and 8) traveling away from the own vehicle M by a distance greater than the target inter-vehicular distance set by the own vehicle M. In a case where no preceding vehicle is detected, the travel controller 11 may cause the own vehicle M to travel at a predetermined vehicle speed. In contrast, in a case where the first preceding vehicle P1 traveling away from the own vehicle M by the distance greater than the target inter-vehicular distance is coming closer to the own vehicle M during the ACC, the travel controller 11 may perform following travel control by causing the own vehicle M to travel following the first preceding vehicle P1. Further, through the ALK control, the travel controller 11 may control the steering operation of the own vehicle M in response to a driving signal outputted to the EPS driving unit 33 so that the own vehicle M travels along a substantially middle line between the right and left mark lines (i.e., lane lines) acquired from the front traveling environment information.

On the basis of the positioning signals received from the GNSS receiver 22, the travel controller 11 may calculate a current position (a coordinate specifying the latitude, the longitude, and the altitude) of the own vehicle M, and an azimuth angle of a traveling direction of the own vehicle M. Further, on the basis of the time signals received from the GNSS receiver 22, the travel controller 11 may correct the date and time of a clock disposed in the travel controller 11. The date and time of the clock may be corrected using a signal received from an internal clock of a roadside device. In one embodiment, the travel controller 11 may serve as an "own-vehicle position detector".

When the first preceding vehicle P1 which the own vehicle M is to follow is detected during the ACC executed by the travel controller 11, the following travel control may be performed to cause the own vehicle M to travel following the first preceding vehicle P1. In this case, a current altitude of the sun Sn (hereinafter referred to as sun height Hsn) may be calculated on the basis of a current date and time with reference to a celestial chart stored in the non-volatile memory and indicative of positions of the sun.

Figure 6:
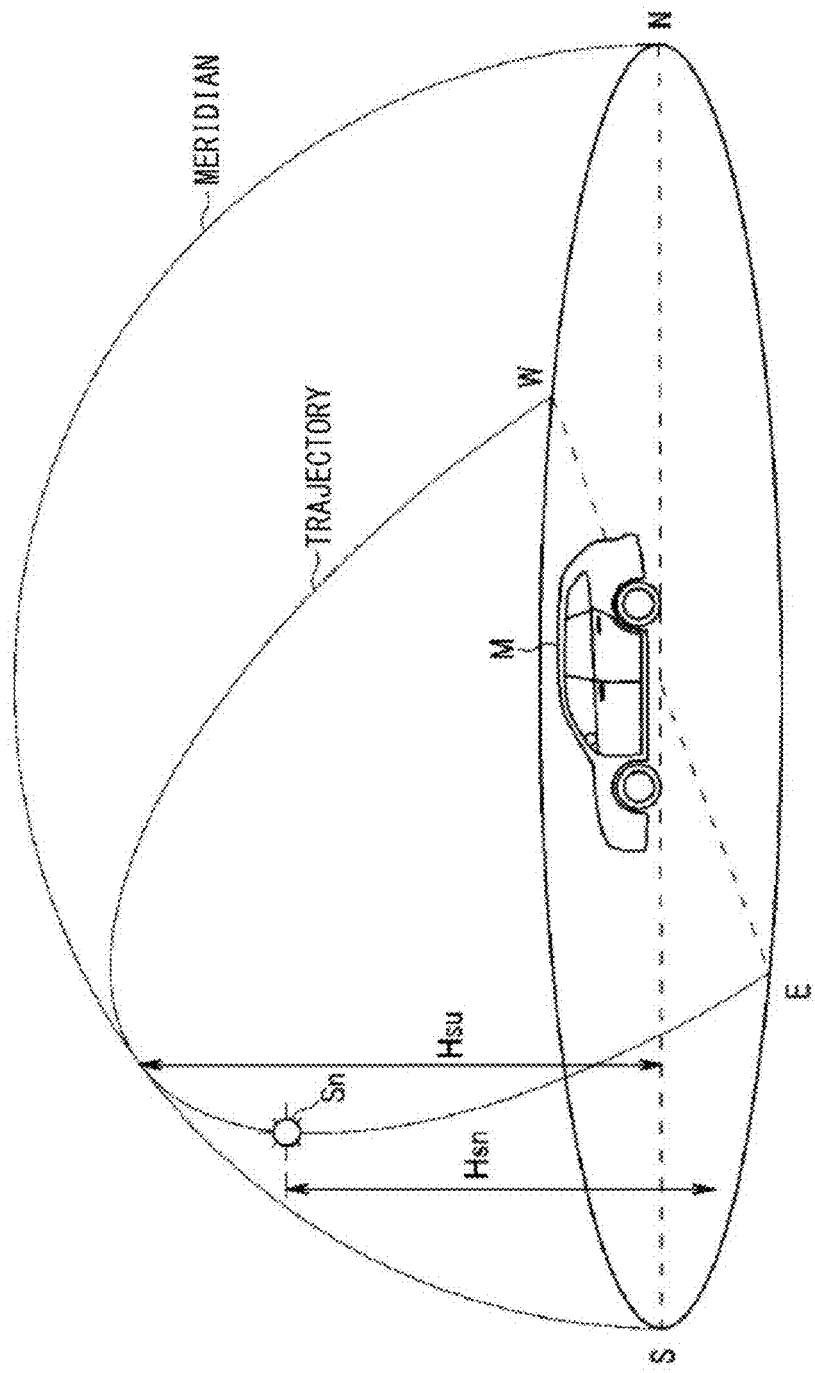
FIG. 6 is a celestial chart illustrating an exemplary trajectory of the sun centered on the position of an own vehicle.

A celestial chart of FIG. 6 illustrates an exemplary trajectory of the sun Sn in a certain season (e.g., Spring Equinox Day or Autumn Equinox Day). The non-volatile memory may preliminarily store celestial data indicative of an annual trajectory of the sun Sn. According to the annual trajectory of the sun, the culmination altitude Hsu (position crossing the meridian) of the sun Sn becomes lower as the winter approaches, whereas the culmination altitude Hsu of the sun Sn becomes higher as the summer approaches.

The travel controller 11 may estimate the position (azimuth angle and sun height Hsn) of the sun Sn on the celestial sphere on the basis of a current date and time with reference to the celestial data, and set an incident angle (azimuth angle and elevation angle) S1 of sunlight with respect to the azimuth angle of the traveling direction of the own vehicle M. Thereafter, on the basis of the incident angle S1 of the sunlight, the travel controller 11 may estimate the direction in which the vehicle shadow extends. Thereafter, the travel controller 11 may detect a vehicle shadow lying in front of the first preceding vehicle P1 (hereinafter referred to as a front vehicle shadow), and estimate the position of the second preceding vehicle P2 on the basis of the position of the front vehicle shadow. Thereafter, on the basis of a change in longitudinal position of the second preceding vehicle P2, the travel controller 11 may estimate abrupt braking of the second preceding vehicle P2.

Figure 2:
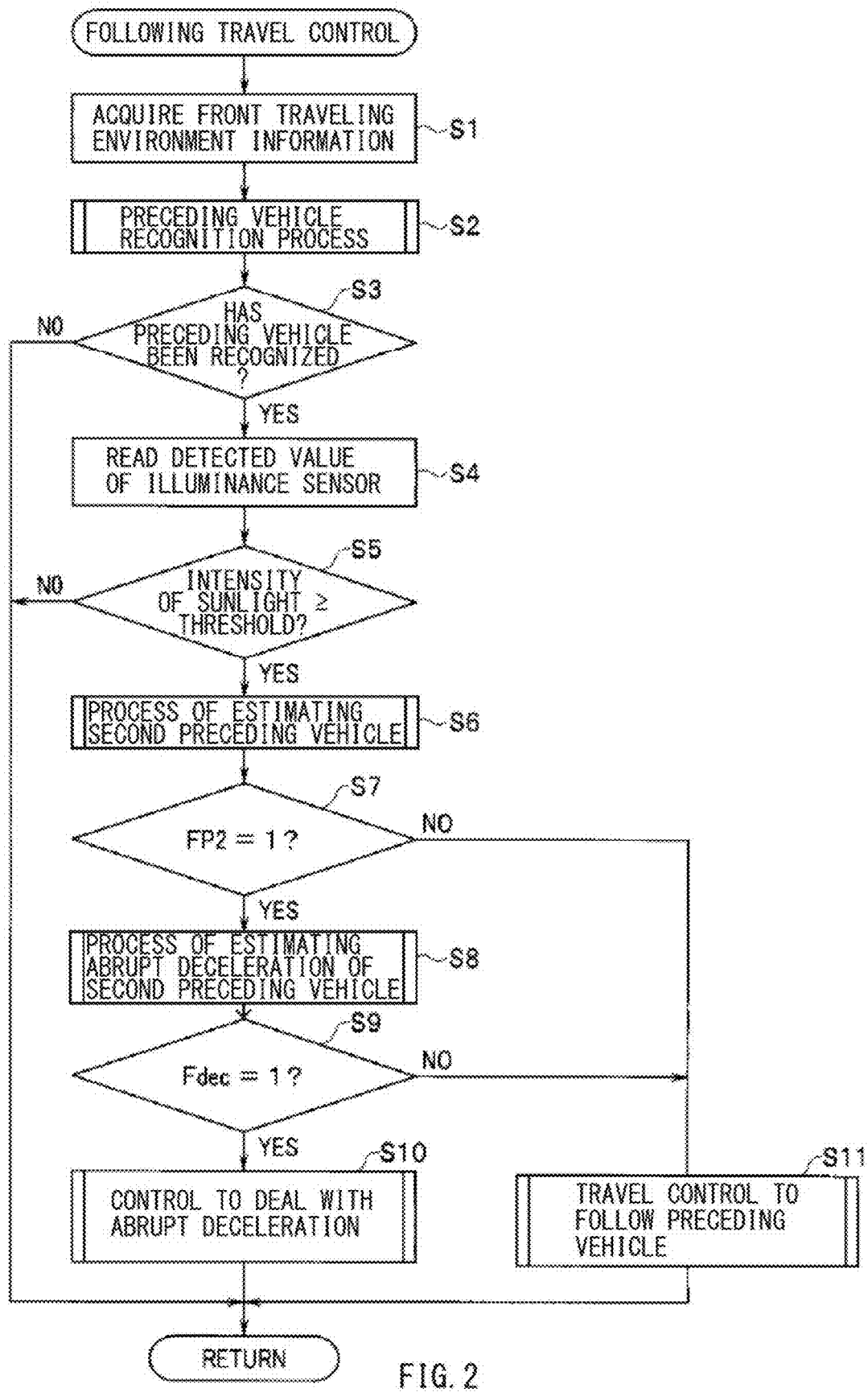
FIG. 2 is a flowchart illustrating an exemplary routine of following travel control.

The above-mentioned following travel control may be executed by the travel controller 11 in accordance with a routine illustrated in FIG. 2, for example. This routine may start with Step S1 that acquires the front traveling environment information acquired by the front traveling environment acquiring unit 21d of the camera unit 21. Thereafter, in Step S2, a preceding vehicle recognition process may be executed. In the preceding vehicle recognition process, it may be determined whether there is the first preceding vehicle P1 traveling away from the own vehicle M by the target inter-vehicular distance or greater and coming closer to the own vehicle M or the first preceding vehicle P1 traveling away from the own vehicle M by the target inter-vehicular distance or less on the basis of the front traveling environment information. In one embodiment, the process in Step S2 may be performed by a "preceding vehicle recognizing unit".

Thereafter, in Step S3, it may be determined whether the first preceding vehicle P1 has been recognized. If the first preceding vehicle P1 has been recognized (Step S3: YES), the procedure may proceed to Step S4. In contrast, if the first preceding vehicle P1 has not been recognized (Step S3: NO), the process may exit the routine, and the ACC may be performed to cause the own vehicle M to travel at a predetermined vehicle speed.

In Step S4, a detected value of the illuminance sensor 23, i.e., the intensity of sunlight may be read. Thereafter, in Step S5, it may be determined whether the intensity of sunlight is greater than or equal to a predetermined threshold. Note that the threshold may be used to determine whether the vehicle shadow casted on the road surface is clearly recognizable by the camera unit 21. For example, low-intensity sunlight can make it difficult to accurately detect edges of the vehicle shadow and decrease accuracy in detecting the second preceding vehicle P2. To address such a concern, the intensity of sunlight may be determined using the threshold, which helps prevent misrecognition. Note that the threshold may be determined in accordance with the characteristics of the camera unit 21 through a preliminary experiment.

If the intensity of sunlight is less than the predetermined threshold (Step S5: NO), the process may exit the routine. In contrast, if the intensity of sunlight is greater than or equal to the threshold (Step S5: YES), the procedure may proceed to Step S6. In Step S6, a process of estimating the second preceding vehicle P2 may be performed and followed by Step S7.

Figure 3:
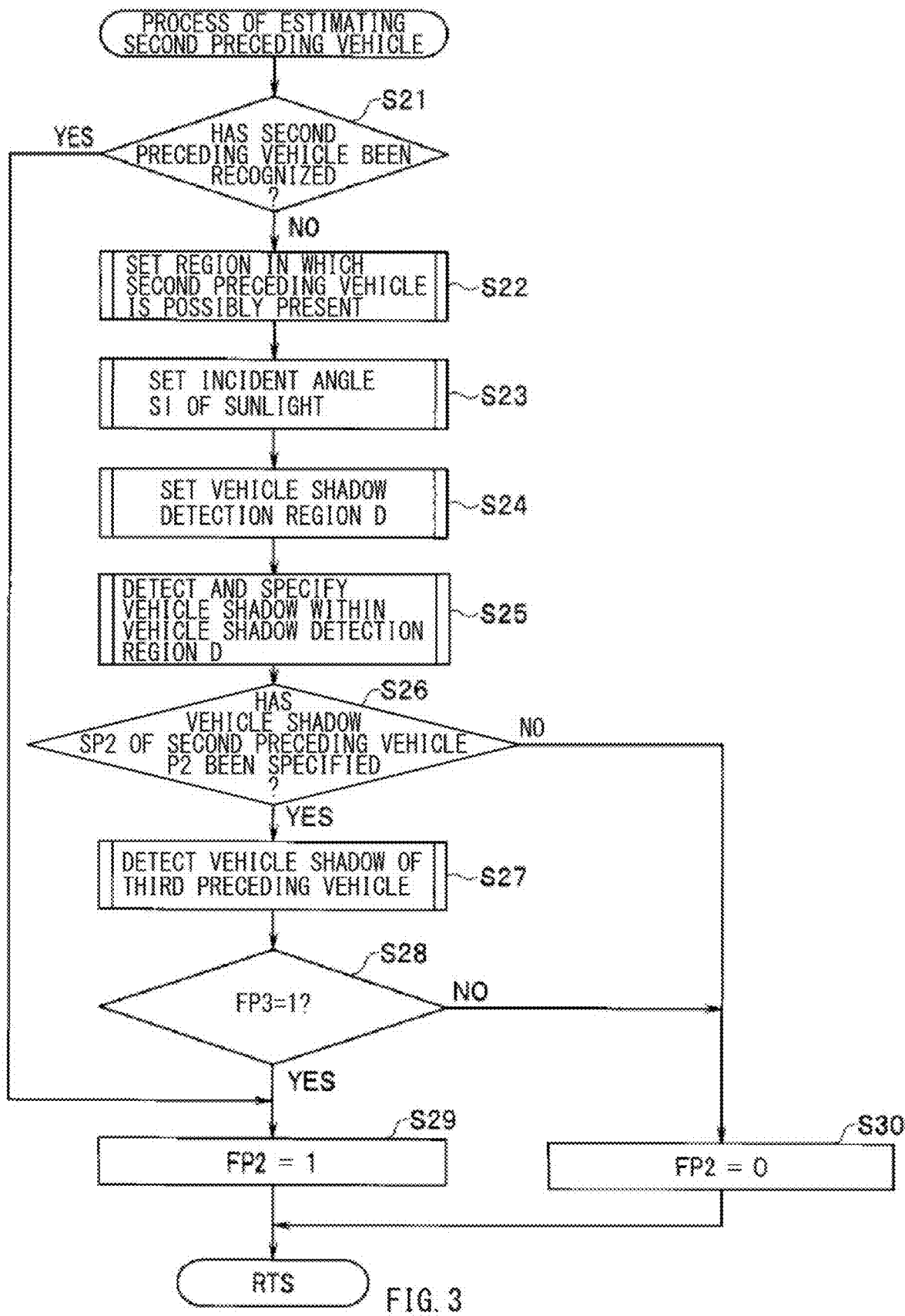
FIG. 3 is a flowchart illustrating an exemplary subroutine of a process of estimating a second preceding vehicle.

The process of estimating the second preceding vehicle P2 in Step S6 may be executed in accordance with a subroutine illustrated in FIG. 3.

This subroutine may start with Step S21 that determines whether the second preceding vehicle P2 traveling in front of the first preceding vehicle P1 has been recognized directly from the front traveling environment information acquired by the front traveling environment acquiring unit 21d. If the second preceding vehicle P2 has been directly recognized (Step S21: YES), the process may jump to Step S29. In contrast, if the second preceding vehicle P2 has not been directly recognized (Step S21: NO), the procedure may proceed to Step S22.

For example, in a case where the first preceding vehicle P1 is an passenger automobile, where the second preceding vehicle P2 is a vehicle having a higher height—such as van body truck, a large truck, or a large bus—than the first preceding vehicle P1, and where the field of view of the own vehicle M is blocked by the rear body of the first preceding vehicle P1, it is difficult for the main camera 21a and the sub-camera 21b of the camera unit 21 mounted on the own vehicle M to capture an image of the environment in front of the first preceding vehicle P1. In contrast, in a case where the first preceding vehicle P1 is a passenger automobile and where the environment in front of the first preceding vehicle P1 is recognizable from the own vehicle M through the rear windshield of the first preceding vehicle P1, it is possible for the main camera 21a and the sub-camera 21b of the camera unit 21 to directly recognize the behavior of the second preceding vehicle P2 through the rear windshield of the first preceding vehicle P1. Note that, the case where the second preceding vehicle P2 is not directly recognizable may include a case where no second preceding vehicle P2 is present.

Figure 7:
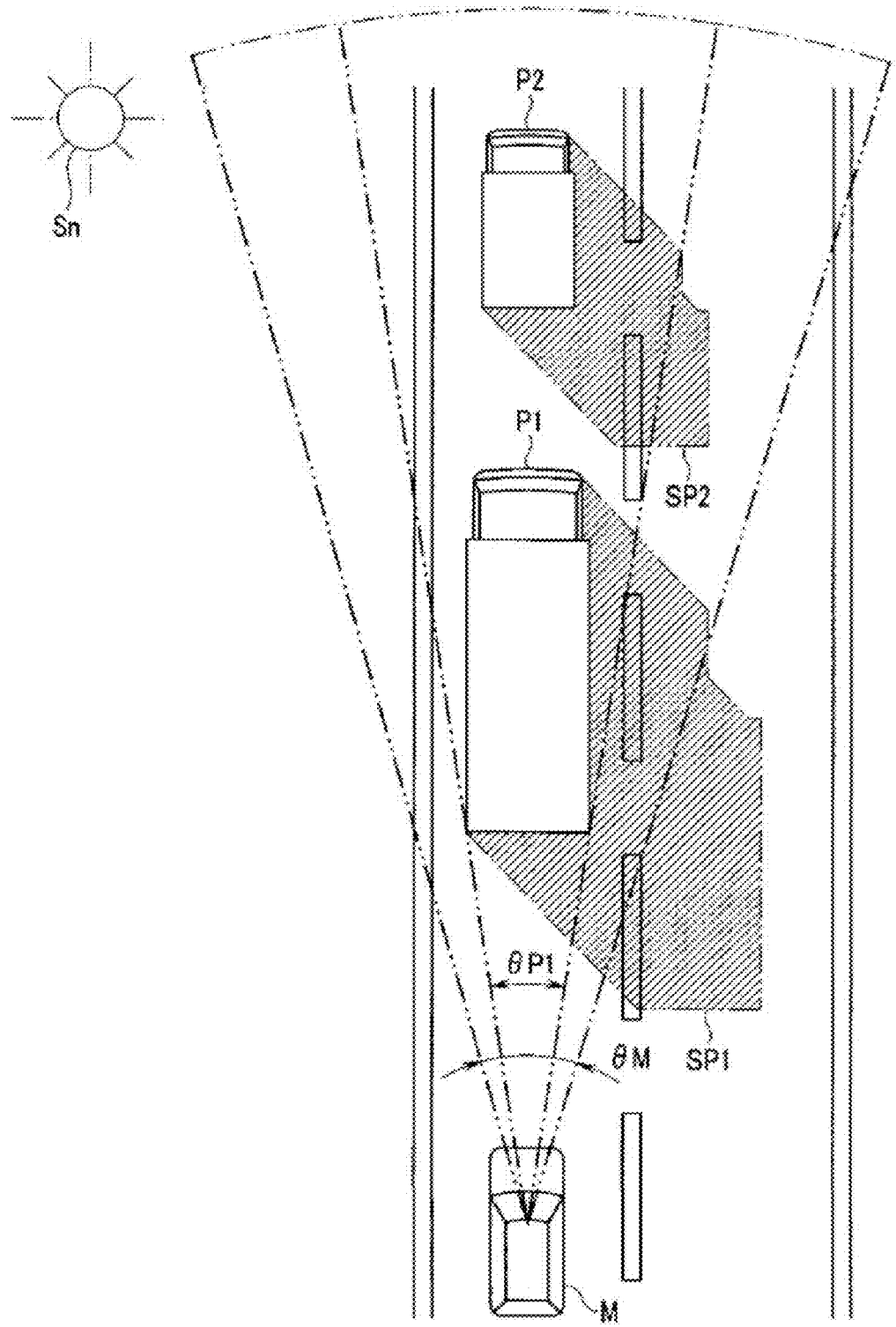
FIG. 7 is an explanatory diagram illustrating the field of view range of the own vehicle with respect to a first preceding vehicle and a second preceding vehicle.

However, even if the fields of view of the main camera 21a and the sub-camera 21b mounted on the own vehicle M are blocked by the first preceding vehicle P1, it is possible for the front traveling environment acquiring unit 21d to recognize the front environment on the right and left sides of the preceding vehicles at a view angle obtained by subtracting a view angle θP1 blocked by the first preceding vehicle P1 from a view angle θM of the main camera 21a and the sub-camera 21b, as illustrated in FIG. 7. Thus, in the following steps, a vehicle shadow SP2 of the second preceding vehicle P2 may be detected to estimate the presence of the second preceding vehicle P2 on the basis of the vehicle shadow SP2.

Figure 9:
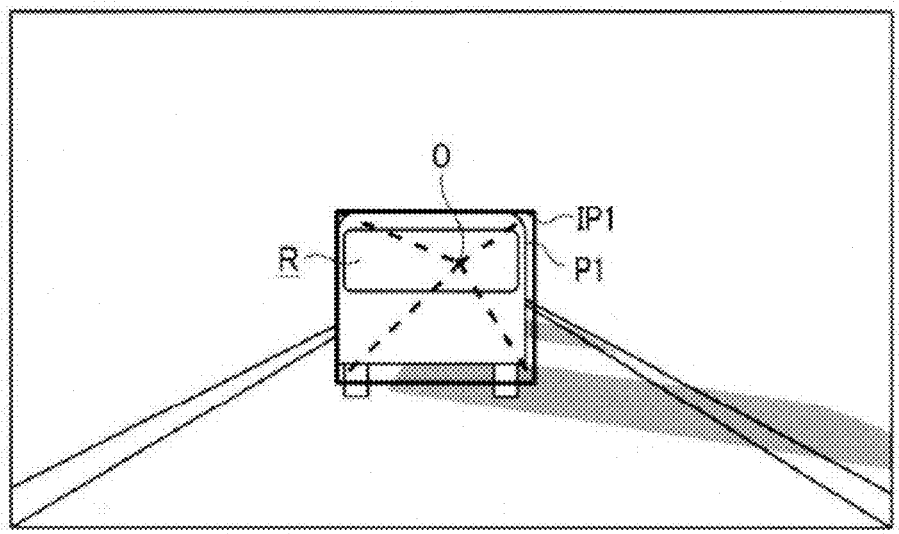
FIG. 9 is an explanatory diagram illustrating how to estimate a possible position of the second preceding vehicle on the basis of a rear outline of the first preceding vehicle recognized by a camera.

First, in Step S22, a possible second preceding vehicle region R may be set in which the second preceding vehicle P2 is possibly present. For example, as illustrated in FIG. 9, an approximate rear outline (contour) IP1 of the first preceding vehicle P1 may be set on the basis of a brightness difference of edges of the rear surface of the first preceding vehicle P1. Then, a front region may be set by connecting four corners of the rear outline IP1 and an infinite point (vanishing point) 0 in the image of the environment in front of the own vehicle M captured by the main camera 21a and the sub-camera 21b.

In a case where the second preceding vehicle P2 belongs to a train of the vehicles including the first preceding vehicle P1, it may be estimated that the second preceding vehicle P2 is present anywhere within the front region. Thus, the front region may be set as the possible second preceding vehicle region R. Note that the vehicle shadow of the first preceding vehicle P1 may be indicated by a reference numeral SP1. In one embodiment, the process in Step S22 may be performed by a "preceding vehicle rear outline setting unit" and a "second preceding vehicle region setting unit".

Figure 10:
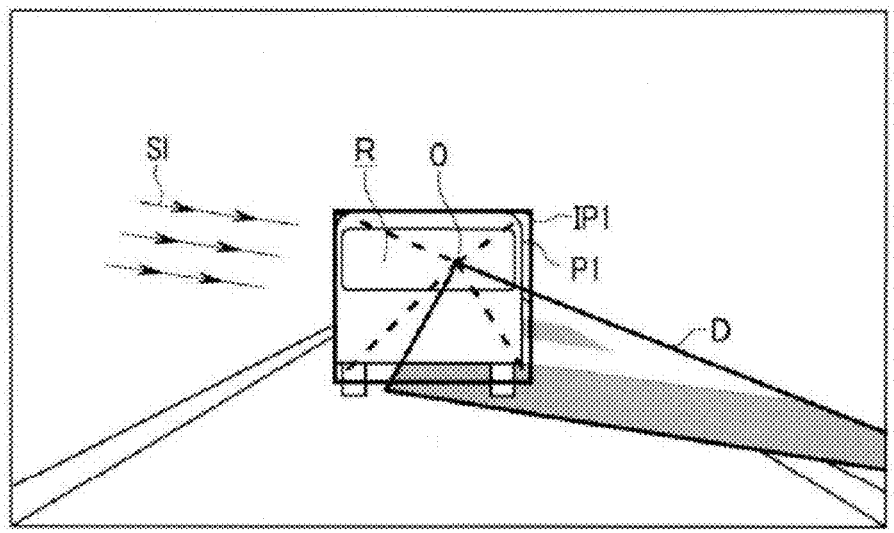
FIG. 10 is an explanatory diagram illustrating how to set a detection region of the vehicle shadow of the second preceding vehicle.

Thereafter, in Step S23, an incident angle S1 (azimuth angle and elevation angle) of sunlight may be set (see FIG. 10). The incident angle S1 of the sunlight may change depending on a current date and time and a traveling direction of the own vehicle M. To calculate the incident angle S1 of the sunlight, a current azimuth angle and a current sun height Hsn of the sun Sn on a celestial chart may be determined on the basis of the current date and time with reference to the celestial data.

On the basis of a temporal change in traveling position of the own vehicle M calculated from the positional signals received from the GNSS receiver 22, the position of the own vehicle M, the azimuth angle of the traveling direction of the own vehicle M, and the longitudinal inclination angle of the own vehicle M may be determined. Thereafter, the incident angle (azimuth angle and elevation angle) S1 of the sunlight with respect to the own vehicle M may be determined on the basis of the position of the own vehicle M, the azimuth angle of the traveling direction of the own vehicle M, the longitudinal incident angle of the own vehicle M, and the azimuth angle and the sun height Hsn of the sun Sn on the celestial chart. In one embodiment, the process in Step S23 may be performed by a "sun position estimating unit", a "traveling azimuth angle acquiring unit", and an "incident angle determining unit".

Next, in Step S24, a vehicle shadow detection region D may be set to detect the vehicle shadow of the second preceding vehicle P2, as illustrated in FIG. 10. In one embodiment, the process in Step S24 may be performed by a "vehicle shadow detection region setting unit".

The vehicle shadow detection region D may be a shaded region defined by the sunlight incident on the possible second preceding vehicle region R detected in Step S22 at the incident angle S1 determined in Step S23. Setting the vehicle shadow detection region D helps accurately detect only the vehicle shadow of the train of vehicles traveling in front of the first preceding vehicle P1. Note that the vehicle shadow detection region D may be sequentially set while the own vehicle M is traveling.

Thereafter, in Step S25, it may be determined whether any shadow is detected within the vehicle shadow detection region D. If detected (Step S25: YES), the shadow may be identified as a vehicle shadow. The vehicle shadow may be identified by calculating a boundary (edges) between the road surface and the shadow within the vehicle shadow detection region D on the basis of a difference in brightness and setting a boundary frame (contour).

Figure 11:
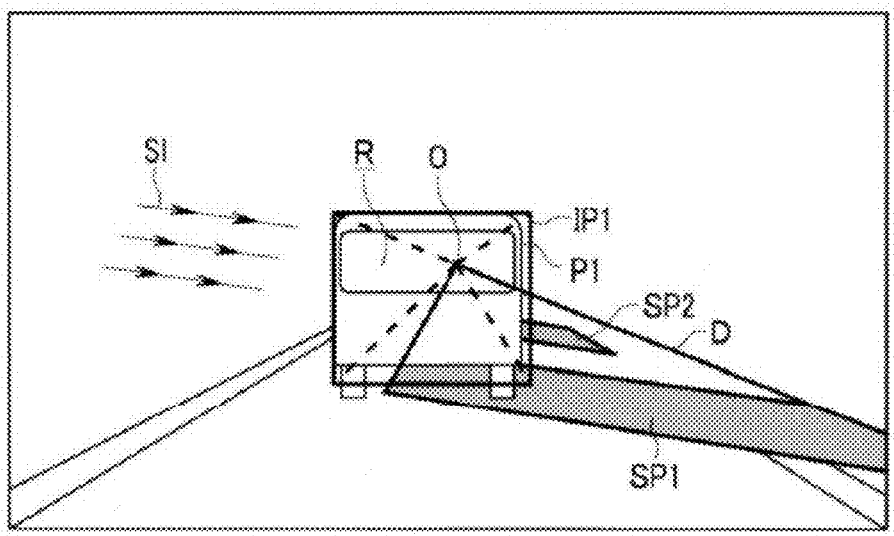
FIG. 11 is an explanatory diagram illustrating how to separately identify the vehicle shadow of the first preceding vehicle and the vehicle shadow of the second preceding vehicle.

Thereafter, as illustrated in FIG. 11, for example, in a case where a first shadow immediately in front of the own vehicle M and a second shadow in front of the first shadow are identified separately, and where it is determined that the second shadow is always present in front of the first shadow, the first shadow may be identified as a vehicle shadow SP1 of the first preceding vehicle P1, and the second shadow may be identified as a vehicle shadow SP2 of the second preceding vehicle P2. In a case where a single shadow is detected within the vehicle shadow detection region D and where the shadow is identified as the vehicle shadow SP1 of the first preceding vehicle P1, it may be determined that no vehicle shadow of the second preceding vehicle P2 is identified. In one embodiment, the process in Step S25 may be performed by a "vehicle shadow detector".

Thereafter, in Step S26, it may be determined whether the vehicle shadow SP2 of the second preceding vehicle P2 has been identified within the vehicle shadow detection region D. If the vehicle shadow SP2 has been identified (Step S26: YES), the procedure may proceed to Step S27. In contrast, if the vehicle shadow SP2 has not been identified (Step S26: NO), the procedure may branch to Step S30 because the presence of the second preceding vehicle P2 has not been clearly determined. In one embodiment, the process in Steps S25 and S26 may be performed by a "front vehicle shadow determining unit".

In Step S27, a process may be performed of detecting a vehicle shadow SP3 of a third preceding vehicle P3 traveling on a lane on a sunlight incident side adjacent to the traveling lane of the own vehicle. Thereafter, the procedure may proceed to Step S28. Herein, the third preceding vehicle P3 may refer to a vehicle traveling on the adjacent lane on the sunlight incident side and traveling in front of the first preceding vehicle P1.

Figure 4:
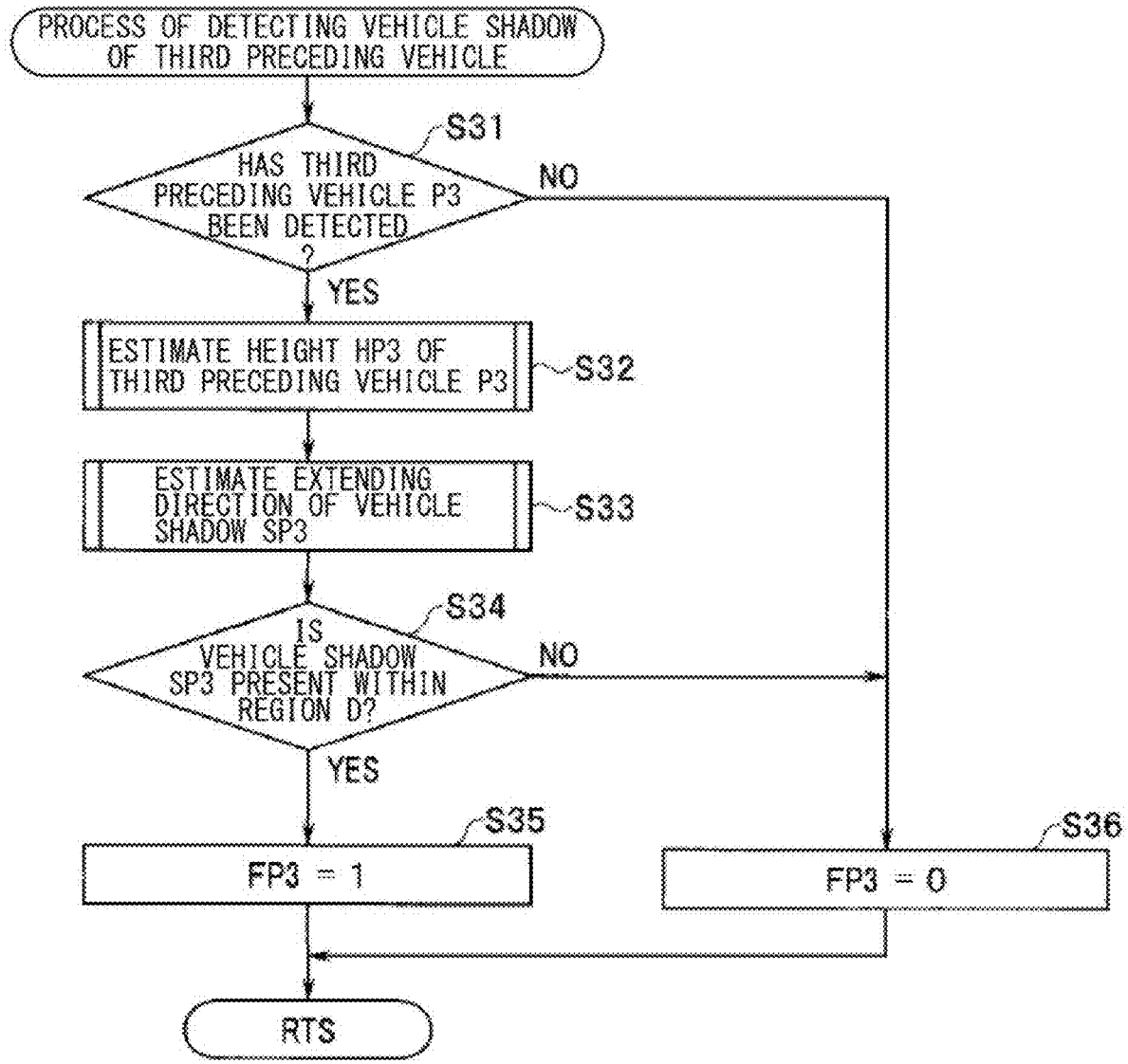
FIG. 4 is a flowchart illustrating an exemplary subroutine of a process of detecting the vehicle shadow of a third preceding vehicle traveling on an adjacent lane.

The process of detecting the vehicle shadow SP3 of the third preceding vehicle P3 in Step S27 may be executed in accordance with a subroutine illustrated in FIG. 4.

Figure 8:
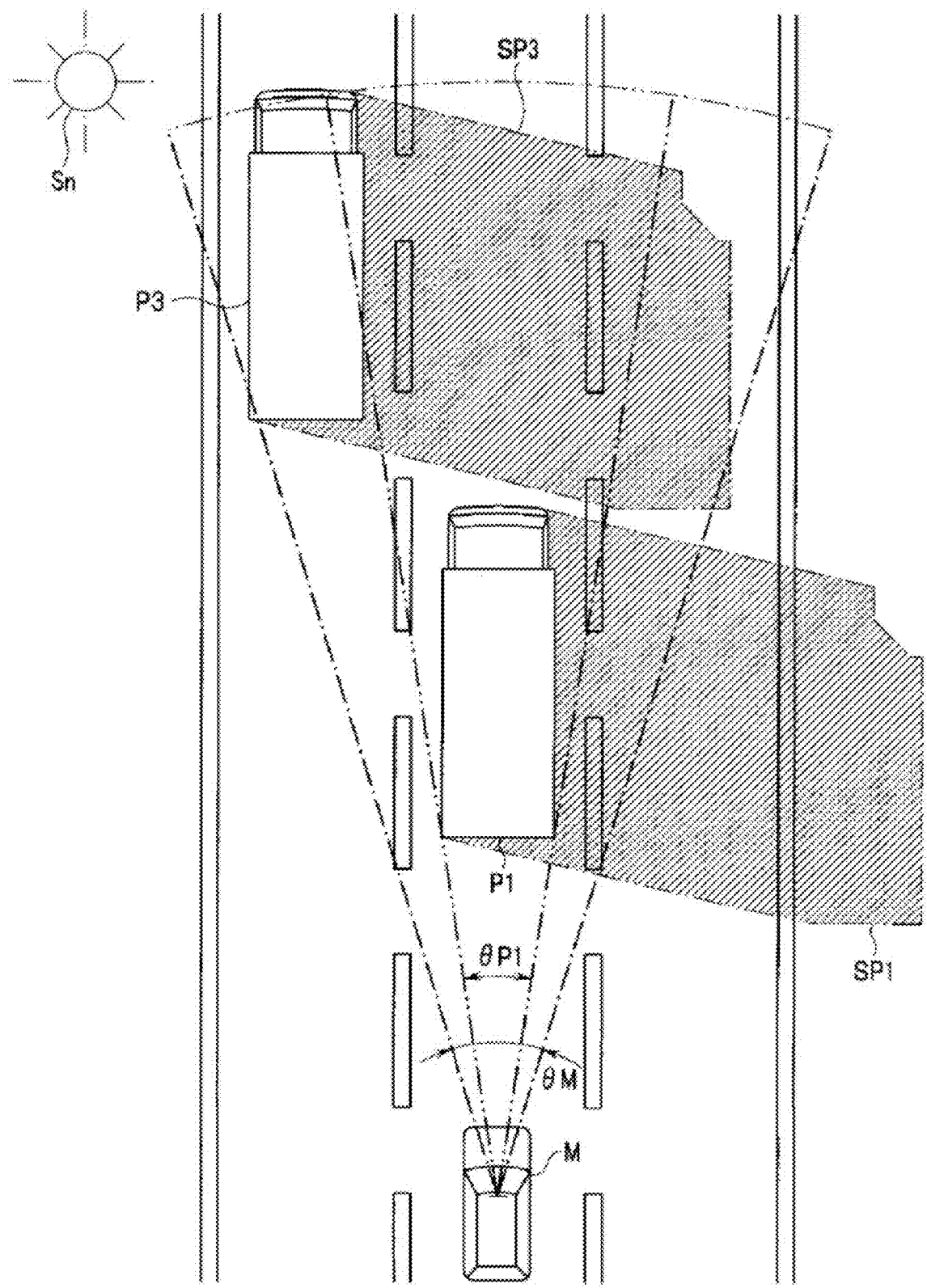
FIG. 8 is an explanatory diagram illustrating the field of view range of the own vehicle with respect to the first preceding vehicle and the third preceding vehicle traveling on the adjacent lane.

This subroutine may start with Step S31 that determines whether a preceding vehicle traveling on the adjacent lane on the sunlight incident side (i.e., the third preceding vehicle) has been detected on the basis of the front traveling environment information. Even if the view angle θM of the main camera 21a and the sub-camera 21b mounted on the own vehicle M is blocked by the view angle θP1 by the first preceding vehicle P1 as illustrated in FIG. 8, the presence or absence of the third preceding vehicle P3 may be determined to some extent by recognizing a vehicle traveling on the adjacent lane on the sunlight incident side despite of the limited field of view.

If the third preceding vehicle P3 has been recognized (Step S31: YES), the procedure may proceed to Step S32. In contrast, if the third preceding vehicle P3 has not been recognized (Step S31: NO), the procedure may jump to Step S36. Note that the case where the third preceding vehicle P3 has not been recognized may include a case where no adjacent lane line has been detected because the own vehicle M is traveling on the lane on the sunlight incident side as illustrated in FIG. 7.

In Step S32, the height HP3 of the third preceding vehicle P3 may be estimated on the basis of the front traveling environment information. The height HP3 of the third preceding vehicle P3 may be estimated through various known methods. For example, the pixel pitch of an image of the rear surface of the third preceding vehicle P3 may be converted into a distance on the basis of the distance from the own vehicle M to the third preceding vehicle P3, and the height HP3 may be calculated on the basis of the number of pixels from a grounded position of the third preceding vehicle P3 on the road surface to a top portion of the rear surface of the body of the third preceding vehicle P3.

Thereafter, in Step S33, a direction in which the vehicle shadow SP3 extends may be estimated on the basis of the height HP3 of the third preceding vehicle P3 and the incident angle S1 of the sunlight determined in Step S23. Thereafter, in Step S34, it may be determined whether the vehicle shadow SP3 is present within the vehicle shadow detection region D determined in Step S24. If the vehicle shadow SP3 is present within the vehicle shadow detection region D (Step S34: YES), the procedure may proceed to Step S35 that sets a flag FP3 to determine the vehicle shadow SP3 of the third preceding vehicle P3 (i.e., the flag FP3 may be set at "1"), and then to Step S28 illustrated in FIG. 3. In contrast, if the vehicle shadow SP3 is not present within the vehicle shadow detection region D (Step S34: NO), the procedure may branch to Step S36 that clears the flag FP3 (i.e., the flag FP3 may be set at "0"), and then proceed to Step S28 illustrated in FIG. 3.

Figure 12:
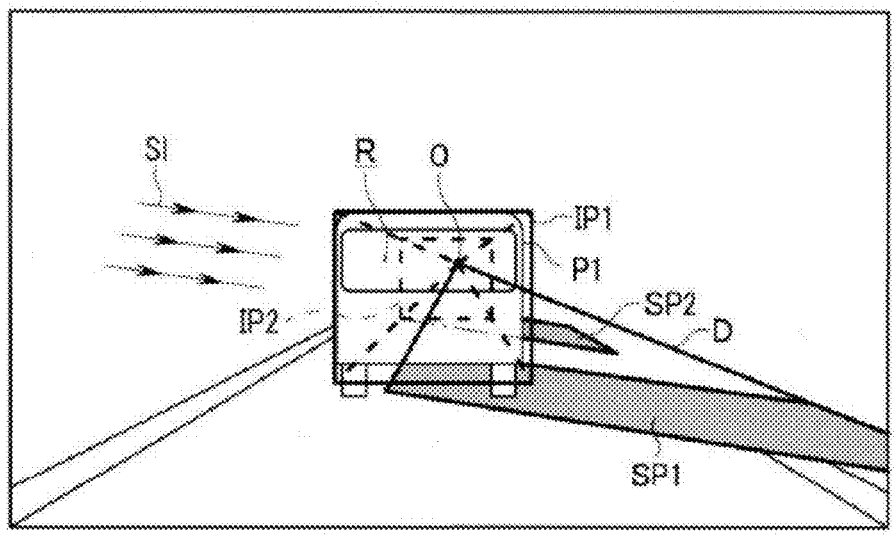
FIG. 12 is an explanatory diagram illustrating how to estimate the position of the second preceding vehicle on the basis of the vehicle shadow of the second preceding vehicle.

For example, in a case where the third preceding vehicle P3 is a large truck or a full-size bus having a large height HP3 as illustrated in FIG. 8 and where sunlight is incident on the third preceding vehicle P3 at a low elevation angle or the incident angle S1, the vehicle shadow SP3 can extend across the lane on which the own vehicle M is traveling to an opposite adjacent lane to the adjacent lane on the sunlight incident side. Such a vehicle shadow SP3 can be erroneously recognized as the vehicle shadow of the second preceding vehicle P2 traveling in front of the own vehicle M on the same lane as the own vehicle M. To prevent such misrecognition, if it is estimated that the vehicle shadow SP3 is present within the vehicle shadow detection region D as illustrated in FIGS. 10 to 12, the flag FP3 may be set (i.e., the flag FP3 may be set at "1").

The procedure may then proceed to Step S28 illustrated in FIG. 3. In Step S28, it may be determined whether the vehicle shadow SP3 of the third preceding vehicle P3 is present within the vehicle shadow detection region D with reference to the value of the flag FP3. If the vehicle shadow SP3 is present within the vehicle shadow detection region D (i.e., if the flag FP3 is set at "1") (Step S28: YES), the procedure may proceed to Step S29. In contrast, if the vehicle shadow SP3 is not present within the vehicle shadow detection region D (i.e., if the flag FP3 is set at "0") (Step S28: NO), the procedure may branch to Step S30.

When the procedure proceeds from Step S21 or S28 to Step S29, a flag FP2 may be set to determine the vehicle shadow SP2 of the second preceding vehicle P2 (i.e., the flag FP2 may be set at "1"), and the procedure may proceed to Step S7 of FIG. 2. In contrast, when the procedure branches from Step S26 or S28 to Step S30, the flag FP2 may be cleared (i.e., the flag FP2 may be set at "0"), and the procedure may proceed to Step S7 of FIG. 2.

In Step S7 of FIG. 2, it may be determined whether the vehicle shadow SP2 has been detected with reference to the value of the flag FP2. If the vehicle shadow SP2 of the second preceding vehicle P2 has been detected (i.e., if the flag FP2 is set at "1") (Step S7: YES), the procedure may proceed to Step S8. In contrast, if the vehicle shadow SP2 of the second preceding vehicle P2 has not been detected (i.e., if the flag FP2 is set at "0") (Step S7: NO), the procedure may jump to Step S11.

Figure 5:
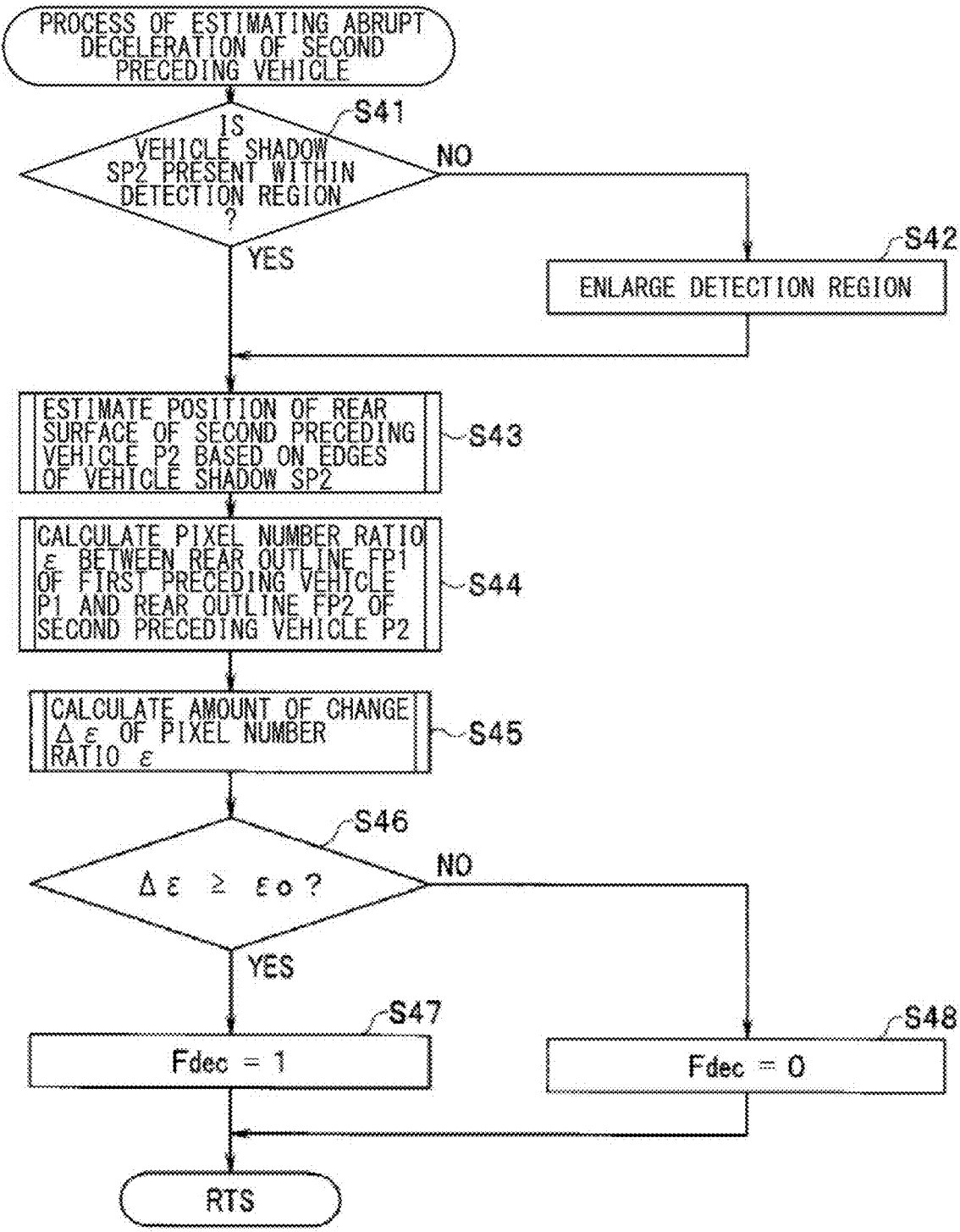
FIG. 5 is a flowchart illustrating an exemplary subroutine of a process of estimating abrupt deceleration of the second preceding vehicle.

In Step S8, a process may be performed of estimating abrupt deceleration of the second preceding vehicle P2. The process of estimating abrupt deceleration of the second preceding vehicle P2 in Step S8 may be executed in accordance with a subroutine illustrated in FIG. 5.

This subroutine may start with Step S41 that determines whether the vehicle shadow SP2 of the second preceding vehicle P2 detected in Step S25 is present within the vehicle shadow detection region D. If the vehicle shadow SP2 of the second preceding vehicle P2 is present within the vehicle shadow detection region D (Step S41: YES), the procedure may proceed to Step S43. In contrast, if the vehicle shadow SP2 of the second preceding vehicle P2 extends beyond the vehicle shadow detection region D (Step S41: NO), the procedure may branch to Step S42.

In Step S42, the vehicle shadow detection region D may be enlarged to the boundary frame of the vehicle shadow SP2, and the procedure may then proceed to Step S43. Enlarging the vehicle shadow detection region D may virtually enlarges the height of the rear outline IP1 of the first preceding vehicle P1 illustrated in FIG. 11. This enables accurate estimation of the rear position of the second preceding vehicle P2 having a large body.

When the procedure proceeds from Step S41 or S42 to Step S43, a rear outline IP2 indicating the position of a rear portion of the second preceding vehicle P2 (hereinafter referred to as a rear outline IP2 of the second preceding vehicle P2) may be set on the basis of the boundary frame of the vehicle shadow SP2, as illustrated in FIG. 12. On the basis of the rear outline IP2, the position of the second preceding vehicle P2 may be estimated. In one embodiment, the process in Step S43 may be performed by a "second preceding vehicle estimating unit".

The vehicle shadow SP2 of the second preceding vehicle P2 may be formed by sunlight incident on the second preceding vehicle P2. Accordingly, as illustrated in FIG. 7, the shape of the vehicle shadow SP2 may be determined substantially by the incident angle S1 of the sunlight and the silhouette of the second preceding vehicle P2 formed by the sunlight.

Accordingly, as illustrated in FIG. 12, the boundary frame of the vehicle shadow SP2 formed by edges of a rear end of the second preceding vehicle P2 may be extended at the incident angle S1 of the sunlight so as to intersect with a sunlight-side lower line of the possible second preceding vehicle region R. Setting the intersection as a reference point, the rear outline IP2 of the second preceding vehicle P2 may be defined by connecting four corners of the possible second preceding vehicle region R with a line at right angle. Note that it is sufficient for the present example embodiment to detect abrupt deceleration of the second preceding vehicle P2. Thus, there is no necessity for measuring the size and actual shape of the second preceding vehicle P2 and the inter-vehicular distance between the own vehicle M and the first preceding vehicle P1.

Thereafter, in Step S44, the ratio $\varepsilon$ ($\varepsilon$=nP2/nP1) may be calculated between the number of pixels nP1 of the image of the rear outline IP1 of the first preceding vehicle P1 and the number of pixels nP2 of the image of the rear outline IP2 of the second preceding vehicle P2 in the vehicle width direction, the vehicle height direction, or the entirety of the images. Thereafter, in Step S45, the amount of temporal change $\Delta\varepsilon$ of the ratio $\varepsilon$ (i.e., $\Delta\varepsilon=\varepsilon(n-1)-\varepsilon$) may be calculated from a difference between the ratio $\varepsilon$ (n-1) previously calculated and the ratio $\varepsilon$ currently calculated. Note that "(n-1)" may indicate a previous calculation.

Figure 13A:
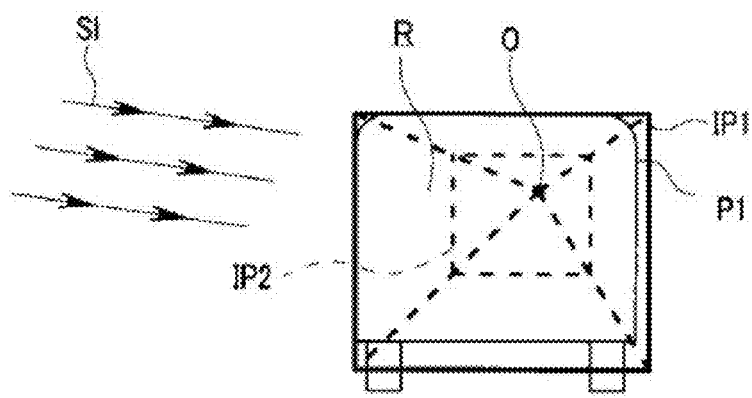
FIG. 13A is an explanatory diagram illustrating an exemplary situation where the first preceding vehicle and the second preceding vehicle are traveling at a constant vehicle speed.
Figure 13B:
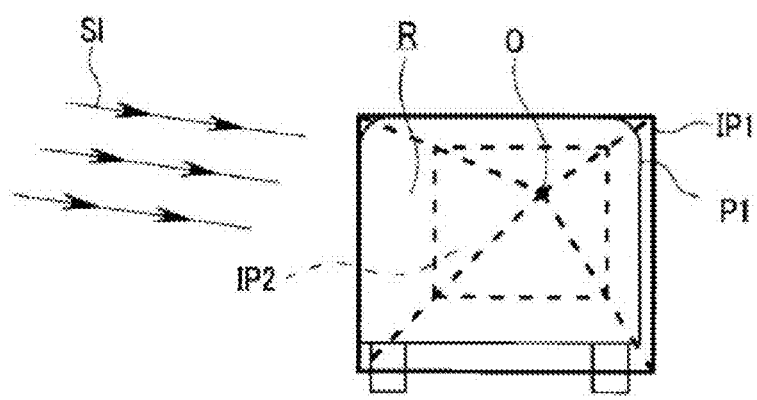
FIG. 13B is an explanatory diagram illustrating an exemplary situation where the second preceding vehicle is making abrupt deceleration.

For example, in a case where the first preceding vehicle P1 is traveling following the second preceding vehicle P2 while maintaining a predetermined inter-vehicular distance, the rear outline IP2 of the second preceding vehicle is unlikely to rapidly change relative to the rear outline IP1 of the first preceding vehicle P1, as illustrated in FIG. 13A. However, in a case where the second preceding vehicle P2 is making abrupt deceleration and thus the inter-vehicular distance between the first preceding vehicle P1 and the second preceding vehicle P2 is becoming shorter, the rear outline IP2 of the second preceding vehicle P2 may be enlarged relative to the rear outline IP1 of the first preceding vehicle P1, as illustrated in FIG. 13B. Accordingly, continuously monitoring the change of the rear outline IP2 of the second preceding vehicle P2 relative to the rear outline IP1 of the first preceding vehicle P1 enables abrupt deceleration of the second preceding vehicle P2 to be estimated as soon as possible. As a result, it is possible to recognize the second preceding vehicle P2 and estimate abrupt deceleration of the second preceding vehicle P2 even if the first preceding vehicle P1 has a large longitudinal length.

Alternatively, the abrupt deceleration of the second preceding vehicle P2 may be estimated by monitoring the interval between the vehicle shadow SP1 of the first preceding vehicle P1 and the vehicle shadow SP2 of the second preceding vehicle P2. It may be estimated that the second preceding vehicle P2 is making abrupt deceleration when the interval between the vehicle shadow SP1 of the first preceding vehicle P1 and the vehicle shadow SP2 of the second preceding vehicle P2 is becoming smaller. However, it difficult to estimate abrupt deceleration on the basis of a change in the interval between the vehicle shadow SP1 and the vehicle shadow SP2 because the azimuth angle of the traveling direction of the vehicle constantly changes when the vehicle is curving or turning to the right or left, for example, and the incident angle S1 of sunlight also changes accordingly.

Thereafter, in Step S46, the amount of change $\Delta\varepsilon$ of the ratio $\varepsilon$ between the number of pixels nP1 and the number of pixels nP2 may be compared with a predetermined value $\varepsilon o$ for determining abrupt deceleration. The predetermined value $\varepsilon o$ may be set through a preliminary experiment, for example. In one embodiment, the process in Steps S44 to S46 may be performed by a "second preceding vehicle abrupt deceleration estimating unit".

If the amount of change $\Delta\varepsilon$ of the ratio $\varepsilon$ is greater than or equal to the predetermined value $\varepsilon o$ (i.e., $\Delta\varepsilon \geq \varepsilon o$) (Step S46: YES), it may be estimated that the second preceding vehicle P2 is making abrupt deceleration, and the procedure may proceed to Step S47 that sets an abrupt deceleration flag Fdec. Thereafter, the procedure may proceed to Step S9 of FIG. 2. In contrast, if the amount of change $\Delta\varepsilon$ of the ratio $\varepsilon$ is less than the predetermined value $\varepsilon o$ (i.e., $\Delta\varepsilon < \varepsilon o$), it may be estimated that the second preceding vehicle P2 is in a steady traveling state, and the procedure may branch to Step S48 that clears the abrupt deceleration flag Fdec. Thereafter, the procedure may proceed to Step S9 of FIG. 2.

In Step S9 of FIG. 2, it may be determined whether the second preceding vehicle P2 has made abrupt deceleration with reference to the abrupt deceleration flag Fdec. If the abrupt deceleration flag Fdec is set at "1" (i.e., Fdec=1) (Step S9: YES), it may be determined that the second preceding vehicle P2 has made abrupt deceleration, and the procedure may proceed to Step S10. In contrast, if the abrupt deceleration flag Fdec is set at "0" (i.e., Fdec=0) (Step S9: NO), it may be determined that second preceding vehicle P2 is traveling at a predetermined speed, and the procedure may branch to Step S11.

In Step S10, control to deal with the abrupt deceleration may be performed, and the procedure may exit the routine. When the procedure branches from Step S7 or S9 to Step S11, typical travel control to follow the preceding vehicle may be continued, and the procedure may exit the routine. In one embodiment, the process in Step S10 may be performed by an "abrupt deceleration controller".

In the control to deal with the abrupt deceleration in Step S10, the target inter-vehicular distance may be set to be a long inter-vehicular distance, for example. This makes it possible to decelerate the own vehicle M with a margin of time and to continue the following travel control even when the first preceding vehicle P1 is making abrupt deceleration.

Alternatively, the abrupt deceleration of the second preceding vehicle P2 may be notified to the driver of the own vehicle M via the notification device 34. This allows the driver of the own vehicle M to prepare for the abrupt deceleration of the preceding vehicle by decelerating the own vehicle M through brake overriding and increasing the inter-vehicular distance. In a case where the own vehicle M is able to make a lane change to an adjacent lane, the notification device 34 may give a notice of a possible lane change to the driver of the own vehicle M to deal with the abrupt deceleration of the first preceding vehicle P1 in advance.

According to the foregoing example embodiments of the technology, even when it is difficult to directly recognize the second preceding vehicle P2 due to the first preceding vehicle P1 traveling on the same lane as the own vehicle M, the position of the second preceding vehicle P2 is estimated on the basis of the vehicle shadow SP2 of the second preceding vehicle P2. Therefore, even if the first preceding vehicle P1 has a long longitudinal length, it is possible to accurately estimate the position of the second preceding vehicle P2 without erroneously recognizing the position of the second preceding vehicle P2.

Further, abrupt deceleration of the first preceding vehicle P1 may be estimated on the basis of the relative movement of the rear outline IP2 of the second preceding vehicle in the longitudinal direction. Accordingly, even if the first preceding vehicle P1 is making abrupt deceleration in response to abrupt deceleration of the second preceding vehicle P2, it is possible for the own vehicle M to appropriately deal with the abrupt deceleration of the first preceding vehicle P1 with a margin of time.

It should be understood that the technology should not be limited to the foregoing example embodiments. For example, the control to deal with abrupt deceleration in Step S10 of the routine of the following travel control illustrated in FIG. 2 may only involve warning the driver of the own vehicle M about abrupt deceleration of the preceding vehicle via the notification device 34. In such a case, the features of the foregoing example embodiments of the technology may also be applied to ordinary manual transmission vehicles or automatic transmission vehicles having no assist control unit performing the ACC and the ALK control, for example.

According to the foregoing example embodiment of the technology, the vehicle shadow of a train of vehicles including a first vehicle shadow of the first preceding vehicle and a front vehicle shadow of a front vehicle traveling in front of the first preceding vehicle is detected on the basis of the difference in brightness from the road surface. If the front vehicle shadow separating from the first vehicle shadow of the first preceding vehicle is identified from the detected vehicle shadow, the position of the second preceding vehicle belonging to the train of the vehicles including the first preceding vehicle is estimated on the basis of the front vehicle shadow. Accordingly, even in a case where the second preceding vehicle is not directly recognizable due to being blocked by the first preceding vehicle having a large longitudinal length, it is possible to recognize the presence of the second preceding vehicle on the basis of the front vehicle shadow with high accuracy. Furthermore, it is possible to estimate abrupt deceleration of the first preceding vehicle on the basis of the behavior of the second preceding vehicle. This achieves appropriate control to deal with the abrupt deceleration.

One or more of the traveling environment information acquiring unit, the preceding vehicle recognizing unit, the vehicle shadow detector, the front vehicle shadow determining unit, and the second preceding vehicle estimating unit in the travel controller 11 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the traveling environment information acquiring unit, the preceding vehicle recognizing unit, the vehicle shadow detector, the front vehicle shadow determining unit, and the second preceding vehicle estimating unit. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the traveling environment information acquiring unit, the preceding vehicle recognizing unit, the vehicle shadow detector, the front vehicle shadow determining unit, and the second preceding vehicle estimating unit in the travel controller 11 illustrated in FIG. 1.

The invention claimed is:

1. A vehicle travel assistance apparatus, comprising:
an abrupt deceleration controller;
a storage configured to store celestial data indicative of positions of a sun;
one or more processors, and
one or more memories that store instructions for causing the one or more processors to execute the instructions, the instructions comprising:
acquiring, from a camera, information on a traveling environment in front of an own vehicle that travels in a traveling lane being captured by the camera;
determining whether a first preceding vehicle traveling, in the traveling lane, immediately in front of the own vehicle is recognized on a basis of the information on the traveling environment;
acquiring, in response to the first preceding vehicle being recognized, from an illuminance sensor, an intensity of sunlight detected by the illuminance sensor;
determining whether the intensity of sunlight is greater than or equal to a predetermined threshold, wherein the predetermined threshold indicates a lowest intensity of sunlight for the camera to recognize a shadow of the own vehicle;
in response to determining that the intensity of sunlight is greater than or equal to the predetermined threshold, detecting a vehicle shadow of a train of vehicles including a first vehicle shadow of the first preceding vehicle and a front vehicle shadow of a front vehicle traveling in front of the first preceding vehicle on a basis of a difference in brightness from a road surface;
determining whether the front vehicle shadow separating from the first vehicle shadow of the first preceding vehicle is identified from the vehicle shadow;
estimating, in response to the front vehicle shadow being determined to be identified from the vehicle shadow, a position of a second preceding vehicle traveling in the traveling lane and belonging to the train of the vehicles including the first preceding vehicle on a basis of the front vehicle shadow, wherein the position of the second preceding vehicle is estimated by calculating a boundary between the road surface and the front vehicle shadow and setting a boundary frame;

estimating abrupt deceleration of the second preceding vehicle on the basis of an estimated position of a rear portion of the second preceding vehicle, wherein the position of the rear portion is estimated on the basis of the boundary frame of the front vehicle shadow; and controlling, in response to the abrupt deceleration of the second preceding vehicle being estimated, of the own vehicle to deal with the abrupt deceleration of the second preceding vehicle by setting a target inter-vehicular distance between the own vehicle and the first preceding vehicle, wherein the instructions further comprise:

estimating a position of the sun on a celestial chart with reference to the celestial data stored in the storage on a basis of a current date and time;

acquiring a traveling azimuth angle of the own vehicle identified by movement of the own vehicle;

setting an incident angle of sunlight on a basis of the position of the sun and the traveling azimuth angle of the own vehicle;

setting a rear outline of the first preceding vehicle on a basis of the recognized first preceding vehicle;

setting a possible second preceding vehicle region in which the second preceding vehicle is possibly present on a basis of the set rear outline of the first preceding vehicle and an infinite point placed in front of the own vehicle;

setting a vehicle shadow detection region on a basis of the set possible second preceding vehicle region and the set incident angle of the sunlight; and identifying a shadow present within the vehicle shadow detection region as the front vehicle shadow;

determining whether a third preceding vehicle traveling is recognized on an adjacent traveling lane to the traveling lane on a sunlight incident side on the basis of the information on the traveling environment;

in response to determining that the third preceding vehicle is recognized on the adjacent traveling lane on the sunlight incident side, determining whether a shadow of the third preceding vehicle is present within the vehicle shadow detection region;

in response to determining that the shadow of the third preceding vehicle is present within the vehicle shadow detection region, not performing an estimation of the abrupt deceleration of the second preceding vehicle; and in response to (1) determining that the third preceding vehicle is not recognized on the adjacent traveling lane on the sunlight incident side or (2) determining that the shadow of the third preceding vehicle is not present within the vehicle shadow detection region, performing the estimation of the abrupt deceleration of the second preceding vehicle.

2. The vehicle travel assistance apparatus according to claim 1, wherein in a case where the front vehicle shadow is determined to be identified, and the instructions further comprise:

setting a rear outline of the second preceding vehicle within the possible second preceding vehicle region on a basis of the front vehicle shadow, and estimate a position of the rear outline of the second preceding vehicle with respect to the rear outline of the first preceding vehicle.

3. The vehicle travel assistance apparatus according to claim 2, wherein the instructions further comprising estimating the abrupt deceleration of the second preceding vehicle on a basis of an amount of temporal change in the rear outline of the second preceding vehicle with respect to the rear outline of the first preceding vehicle.

4. The vehicle travel assistance apparatus according to claim 3, wherein the abrupt deceleration controller is configured to perform control to deal with the abrupt deceleration of the second preceding vehicle by causing a monitor or a speaker to notify a driver of the own vehicle of the abrupt deceleration of the second preceding vehicle in a case where the abrupt deceleration of the second preceding vehicle is estimated.

5. A vehicle travel assistance apparatus comprising:

circuitry configured to:

store celestial data indicative of positions of a sun;

acquire, from a camera, information on a traveling environment in front of an own vehicle that travels in a traveling lane being captured by the camera;

determine whether a first preceding vehicle traveling, in the traveling lane, immediately in front of the own vehicle is recognized on a basis of the information on the traveling environment;

acquire, in response to the first preceding vehicle being recognized, from an illuminance sensor, an intensity of sunlight detected by the illuminance sensor;

determine whether the intensity of sunlight is greater than or equal to a predetermined threshold, wherein the predetermined threshold indicates a lowest intensity of sunlight for the camera to recognize a shadow of the own vehicle;

in response to determining that the intensity of sunlight is greater than or equal to the predetermined threshold, detect a vehicle shadow of a train of vehicles including a first vehicle shadow of the first preceding vehicle and a front vehicle shadow of a front vehicle traveling in front of the first preceding vehicle on a basis of a difference in brightness from a road surface;

determine whether the front vehicle shadow separating from the first vehicle shadow of the first preceding vehicle is identified from the vehicle shadow;

estimate, in response to the front vehicle shadow being determined to be identified from the vehicle shadow, a position of a second preceding vehicle belonging to the train of the vehicles including the first preceding vehicle on a basis of the front vehicle shadow, wherein the position of the second preceding vehicle is estimated by calculating a boundary between the road surf ace and the front vehicle shadow and setting a boundary frame;

estimate abrupt deceleration of the second preceding vehicle on the basis of an estimated position of a rear portion of the second preceding vehicle, wherein the position of the rear portion is estimated on the basis of the boundary frame of the front vehicle shadow; and perform control, in response to the abrupt deceleration of the second preceding vehicle being estimated, of the own vehicle to deal with the abrupt deceleration of the second preceding vehicle by setting a target inter-vehicular distance between the own vehicle and the first preceding vehicle, wherein the circuitry is configured to:
estimate a position of the sun on a celestial chart with reference to the celestial data stored on a basis of a current date and time;
acquire a traveling azimuth angle of the own vehicle identified by movement of the own vehicle;
set an incident angle of sunlight on a basis of the position of the sun and the traveling azimuth angle of the own vehicle;
set a rear outline of the first preceding vehicle on a basis of the recognized first preceding vehicle;
set a possible second preceding vehicle region in which the second preceding vehicle is possibly present on a basis of the set rear outline of the first preceding vehicle and an infinite point placed in front of the own vehicle;
set a vehicle shadow detection region on a basis of the set possible second preceding vehicle region and the set incident angle of the sunlight; and
identify a shadow present within the vehicle shadow detection region as the front vehicle shadow;
determine whether a third preceding vehicle traveling is recognized on an adjacent traveling lane to the traveling lane on a sunlight incident side on the basis of the information on the traveling environment;
in response to determining that the third preceding vehicle is recognized on the adjacent traveling lane on the sunlight incident side, determine whether a shadow of the third preceding vehicle is present within the vehicle shadow detection region;
in response to determining that the shadow of the third preceding vehicle is present within the vehicle shadow detection region, not perform an estimation of the abrupt deceleration of the second preceding vehicle; and
in response to (1) determining that the third preceding vehicle is not recognized on the adjacent traveling lane on the sunlight incident side or (2) determining that the shadow of the third preceding vehicle is not present within the vehicle shadow detection region, perform the estimation of the abrupt deceleration of the second preceding vehicle.

6. A vehicle travel assistance apparatus comprising:
circuitry configured to:
acquire information on a traveling environment in front of an own vehicle that travels in a traveling lane;
determine whether a first preceding vehicle traveling, in the traveling lane, immediately in front of the own vehicle is recognized on a basis of the information on the traveling environment;
in response to the first preceding vehicle being recognized, detect a vehicle shadow of a train of vehicles including a first vehicle shadow of the first preceding vehicle and a front vehicle shadow of a front vehicle traveling in front of the first preceding vehicle on a basis of a difference in brightness from a road surface;
determine whether the front vehicle shadow separating from the first vehicle shadow of the first preceding vehicle is identified from the vehicle shadow;
estimate, in response to the front vehicle shadow being determined to be identified from the vehicle shadow, a position of a second preceding vehicle belonging to the train of the vehicles including the first preceding vehicle on a basis of the front vehicle shadow, wherein the position of the second preceding vehicle is estimated by calculating a boundary between the road surface and the front vehicle shadow and setting a boundary frame;
estimate abrupt deceleration of the second preceding vehicle on the basis of an estimated position of a rear portion of the second preceding vehicle, wherein the position of the rear portion is estimated on the basis of the boundary frame of the front vehicle shadow; and
perform control, in response to the abrupt deceleration of the second preceding vehicle being estimated, to deal with the abrupt deceleration of the second preceding vehicle by setting a target inter-vehicular distance between the own vehicle and the first preceding vehicle;
wherein the own vehicle is kept at the set target inter-vehicular distance from the first preceding vehicle by controlling a deceleration of the own vehicle, wherein the circuitry is configured to:
estimate a position of the sun on a celestial chart with reference to the celestial data stored on a basis of a current date and time;
acquire a traveling azimuth angle of the own vehicle identified by movement of the own vehicle;
set an incident angle of sunlight on a basis of the position of the sun and the traveling azimuth angle of the own vehicle;
set a rear outline of the first preceding vehicle on a basis of the recognized first preceding vehicle;
set a possible second preceding vehicle region in which the second preceding vehicle is possibly present on a basis of the set rear outline of the first preceding vehicle and an infinite point placed in front of the own vehicle;
set a vehicle shadow detection region on a basis of the set possible second preceding vehicle region and the set incident angle of the sunlight; and
identify a shadow present within the vehicle shadow detection region as the front vehicle shadow;
determine whether a third preceding vehicle traveling is recognized on an adjacent traveling lane to the traveling lane on a sunlight incident side on the basis of the information on the traveling environment;
in response to determining that the third preceding vehicle is recognized on the adjacent traveling lane on the sunlight incident side, determine whether a shadow of the third preceding vehicle is present within the vehicle shadow detection region;
in response to determining that the shadow of the third preceding vehicle is present within the vehicle shadow detection region, not perform an estimation of the abrupt deceleration of the second preceding vehicle; and
in response to (1) determining that the third preceding vehicle is not recognized on the adjacent traveling lane on the sunlight incident side or (2) determining that the shadow of the third preceding vehicle is not present within the vehicle shadow detection region, perform the estimation of the abrupt deceleration of the second preceding vehicle.

* * * * *